Dec. 16, 1952    R. E. KESEL ET AL    2,621,570
CAMERA SHUTTER WITH TWO SUCCESSIVELY OPERATED BLADES
Filed Nov. 24, 1950    2 SHEETS—SHEET 1
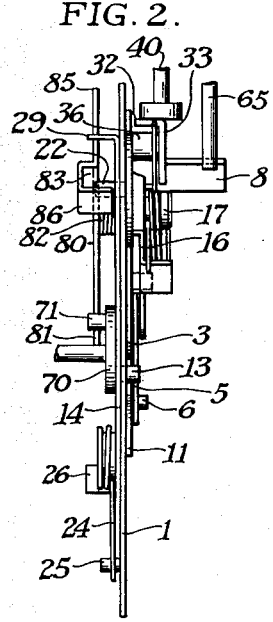
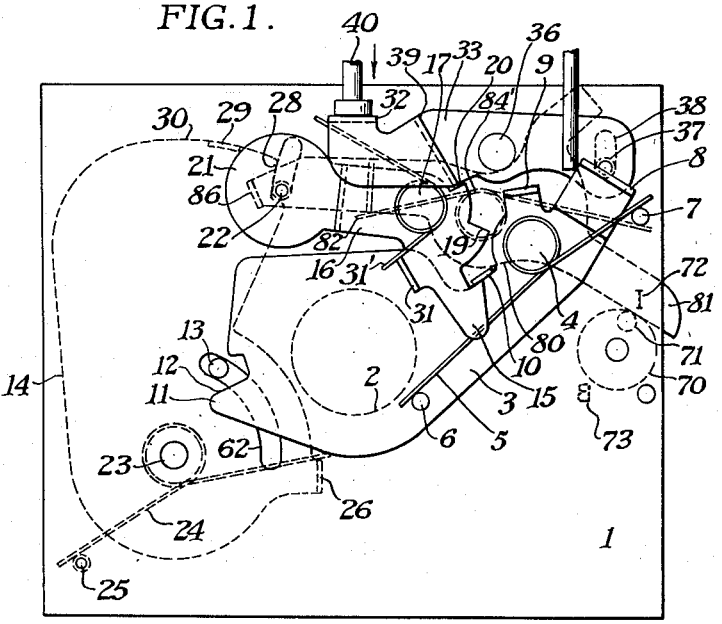
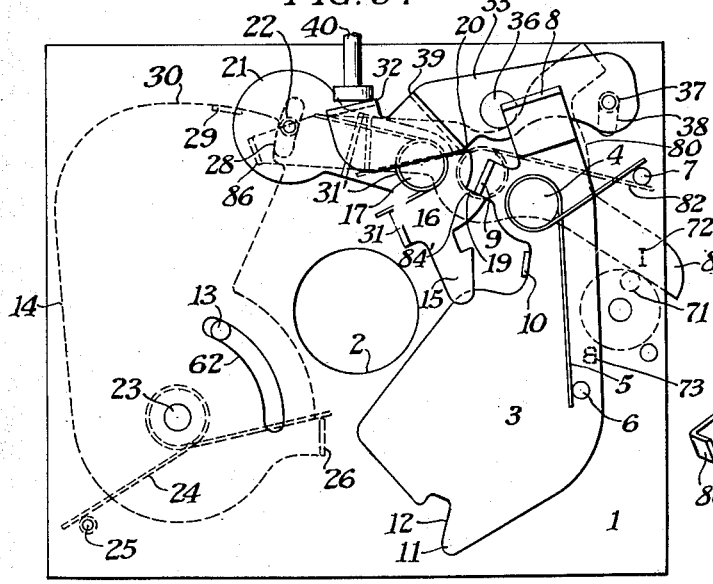
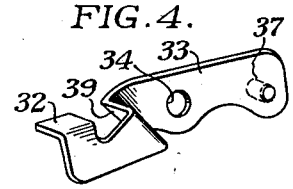
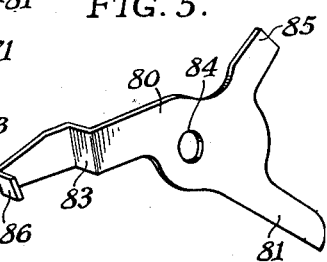
ROBERT E. KESEL
HERBERT T. ROBINSON
Inventors
By Daniel J. Mayne
Donald H. Stewart
Attorneys Dec. 16, 1952 R. E. KESEL ET AL 2,621,570
CAMERA SHUTTER WITH TWO SUCCESSIVELY OPERATED BLADES
Filed Nov. 24, 1950 2 SHEETS—SHEET 2
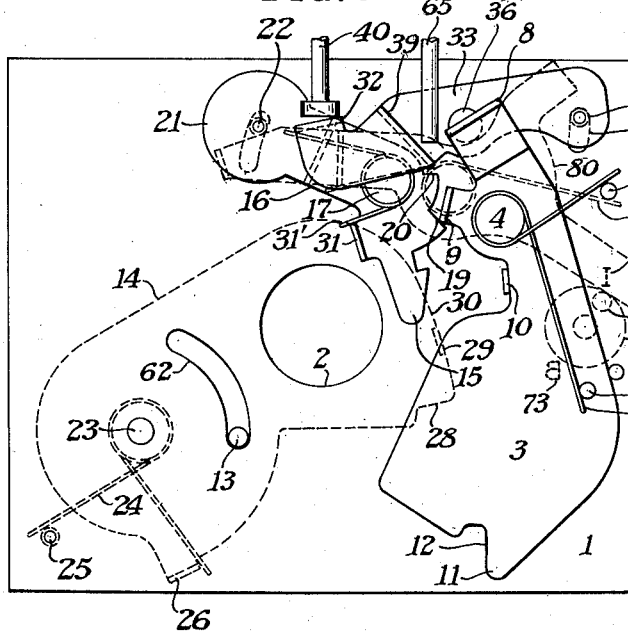
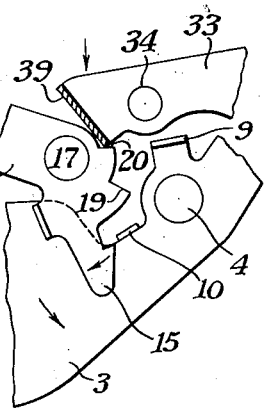
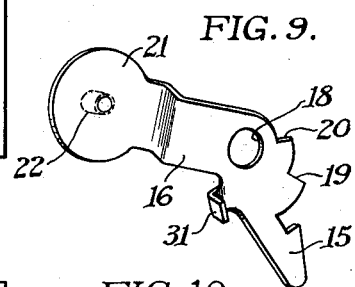
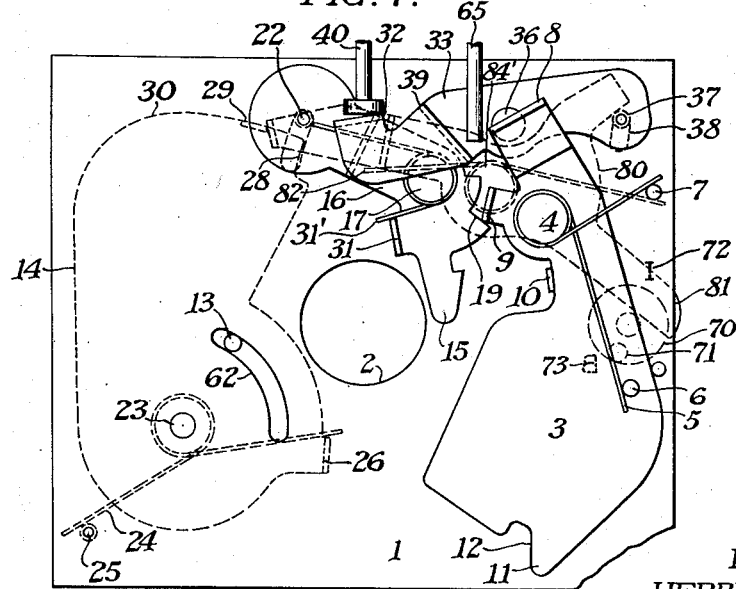
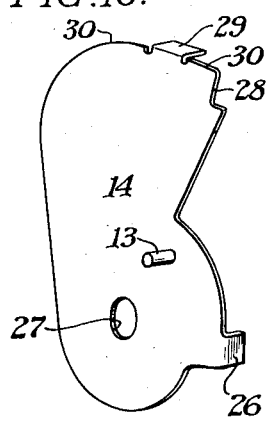
ROBERT E. KESEL
HERBERT T. ROBINSON
Inventors Patented Dec. 16, 1952

2,621,570

UNITED STATES PATENT OFFICE 2,621,570

CAMERA SHUTTER WITH TWO SUCCESSIVELY OPERATED BLADES

Robert E. Kesel and Herbert T. Robinson, Rochester, N. Y., assignors to Eastman Kodak Company, Rochester, N. Y., a corporation of New Jersey Application November 24, 1950, Serial No. 197,220

4 Claims. (Cl. 95—60)

This application relates to camera shutters, and particularly to relatively inexpensive shutters of the type used on box cameras. One object of our invention is to provide a simple type of shutter with which a single, accurately timed exposure can be obtained. Another object of our invention is to provide a shutter in which the exposure aperture is quickly opened, in which the aperture remains fully open for a material proportion of the total exposure, and in which the aperture is quickly closed, so that the total exposure may be efficient. A further object of our invention is to provide a simple type of setting shutter which will be comparatively simple to assemble, and which will require a minimum of handwork and adjustments to perform satisfactorily. A still further object of our invention is to provide a shutter which can be made extremely small in size to go into a compact camera. Other objects will appear from the following specification, the novel features being particularly pointed out in the claims at the end thereof.

In most simple shutters, where there are two blades, it is customary to move the blades symmetrically in one direction to open an exposure aperture, and in a second direction to close an exposure aperture. Such shutters have certain disadvantages in that considerable mechanism is usually required for the simultaneously operated blades, and it is sometimes difficult to control the exposures. In accordance with our structure, the shutter blades are not symmetrical, nor are they simultaneously operated. We prefer to provide a shutter in which the exposure aperture is covered by one blade while the other blade lies to one side of the exposure aperture, and to move the blade covering the exposure aperture to open the aperture and at a predetermined time thereafter to close the aperture with the second-mentioned shutter blade. In this way, even though the shutter blades may each move rapidly, an exposure can be made with a high degree of efficiency because of the interval between the operation of the two blades. It also enables a shutter to be constructed with relatively rugged parts and with substantial springs for operating the parts without making the exposure too fast.

Coming now to the drawings wherein like reference characters denote like parts throughout:

Fig. 1 is a top plan view of a shutter constructed in accordance with and embodying a preferred form of our invention. In this figure the shutter parts are set and in a position to be operated;

Fig. 2 is a side elevation of the shutter shown in Fig. 1;

Fig. 3 is a view similar to Fig. 1, but with the exposure aperture in an open position while an exposure is being made;

Fig. 4 is a perspective view of the trigger lever removed from the shutter;

Fig. 5 is a perspective view of the bulb lever removed from the shutter;

Fig. 6 is a view similar to Fig. 1, but with the shutter parts in the position they assume after an exposure has been completed and before the shutter has been reset;

Fig. 7 is a view similar to Fig. 1 but with the shutter parts in position to make a bulb exposure, the exposure aperture being shown open in this view;

Fig. 8 is a fragmentary detail, partially in section, showing the relationship of the shutter trigger lever, the shutter latch and one of the shutter blades;

Fig. 9 is a perspective view of the shutter latch member removed from the rest of the mechanism; and Fig. 10 is a perspective view of one of the shutter blades removed from the mechanism.

Our invention broadly comprises a shutter made from metal stampings and having two blades each pivotally mounted on a supporting plate to cover and uncover an exposure aperture. Mechanism is provided for removing one shutter blade from the exposure aperture and permitting a second shuter blade to move across the exposure aperture at a predetermined interval of time after the operation of the first shutter blade. For convenience, one shutter blade will be called the opening blade, since it moves to open the exposure aperture, and the other shutter blade will be called the closing blade because this blade closes the aperture after an exposure is complete.

More specifically, our shutter may be of the form shown in the illustrated preferred embodiment wherein there is a support or plate 1 having an exposure aperture 2 through which light passes into a camera. There is an opening shutter blade 3, which blade is pivoted on a stud 4 and is normally turned in a counterclockwise direction with reference to Fig. 1 by a spring 5 having one end engaging a pin 6 on the shutter blade, and the other end engaging a pin 7 on the support 1. Shutter blade 3 is provided with a setting arm 8 preferably bent at right angles to the shutter plate, a tripping arm 9 also bent at an angle to the plate, and a latching lug 10. These arms and lug preferably lie close to the stud 4. The shutter plate 3 has a setting finger 11 with a cam surface 12 adapted to engage a pin 13 on the closing shutter blade 14 in order to set this shutter blade to the position shown in Fig. 1, as will be hereinafter more fully described.

The opening blade 3 may be held in its set position of Fig. 1 by means of a latch member 15, best shown in Fig. 9; this latch member forming a part of a lever 16 pivoted to turn on a stud 17 which may pass through an aperture 18 in the lever. In addition to the latching element 15, this latch element is provided with a shoulder 19, a second shoulder 20, an offset portion 21 and a pin 22 adapted to form a latch element for holding the closing shutter blade 14 in its set position shown in Fig. 1.

The closing shutter blade 14 may turn upon a stud 23 under the influence of a spring 24 encircling the stud and having one end of the spring engaging a pin 25 on the mechanism plate 1, and the other end engaging a formed-over lug 26 carried by the closing shutter blade 14. This blade has an opening 27 through which the stud 23 may pass. The blade also has a flat surface 28 which forms a latch element when lying against the pin 22 as shown in Fig. 1. In addition, there is a formed-over lug 29 which lug forms a continuation of an arcuate surface 30 which extends about the center of the aperture 27.

The latch lever 16 is normally turned in a counterclockwise direction relative to Fig. 1 by a spring 31' engaging a lug 31 at one end, the other end of the spring lying beneath a flange 32 on a trigger lever 33 as shown in Fig. 4. The trigger lever 33 includes an aperture 34 through which a stud 36 passes and a pin 37 extending through a slot 38 in the plate 1 to limit the motion of this member on the plate. There is an offset section 39 between the aperture 34 and the formed-over lug 32, the function of which is to engage the shoulder 20 of the latch 16 when a shutter trigger 40 is moved in the direction shown by the arrow in Fig. 1. When this occurs, the latch lever 16 is moved to the extent shown in Fig. 8, at which time the latch 15 is moved away from a lug 10 carried by the opening shutter plate 3. This starts the exposure in that it releases the shutter plate 3, permitting it to turn counterclockwise with respect to the stud 4 in Fig. 1, thereby uncovering the exposure aperture 2. This aperture remains uncovered as the opening shutter plate 3 continues to move and until the lug 9 strikes the shoulder 19 of the latch element 16, as is occurring in the position shown in Fig. 3. When this occurs, the latch 16 is moved further than it can be moved by the trigger lever 33 and, as this movement continues, the pin 22 rides up the surface 28 on the closing blade 14 until the pin reaches the arcuate surface 30 so that the closing blade 14 may now move in a clockwise direction with reference to Fig. 1 under the impulse of its spring 24. This blade moves and finally closes the aperture 2 as it reaches the limit of its movement which, in the present instance, is controlled by the movement of a pin 13 through a slot 62 in the mechanism plate 1. When this position is reached, as in Fig. 6, an exposure has been completed.

In order to restore the parts to their Fig. 1 position, to set the shutter the setting arm 8 is moved in a clockwise direction. This not only turns the opening shutter blade 3 about its supporting pivot 4, but the following movements take place. The opening blade 3 is moved quite a distance before it starts to close the exposure aperture 2. About the time this aperture has been fully closed, the cam 12 may engage the pin 13 of the closing blade 14 while this pin 13 lies in the Fig. 6 position. The aperture 2 at this point is fully covered by both blades. However, continued movement of the opening blade 3 rocks the pin 13 through the slot 62 and thereby moves the closing blade 14 upon its pivot 23 to the Fig. 1 position. As it reaches the Fig. 1 position, the pin 22 of the latch rides over the arcuate surfaces 30 and drops behind the latching surface 28 to hold the closing blade in its set position.

When moved to set the closing blade 14, the opening blade is moved past the position shown in Fig. 1, a distance sufficient to clear the latch 15 so that when the setting arm 8 is released and the blade moves in a counterclockwise direction a short distance, the latch 15 will engage the lug 10, thereby holding this blade in its set position shown.

We have shown a pin 65 for engaging the setting arm 8 and moving it to the Fig. 1 position from the Fig. 6 position and, in practice, this pin can be moved as by a slide on the outside of the shutter, or preferably by a double exposure prevention slide, forming no part of the present invention and not further shown herein.

For exposures of longer duration than the instantaneous exposure which can be made as above described, bulb exposures may be made in the following manner. A dial, diagrammatically shown at 70 in Fig. 1, may be provided with a knob which can move a pin 71 to an indicating mark "I" at 72 or to a second indicating mark "B" at 73. This moves the pin 71 to control the bulb lever shown at 80 in Fig. 5. The bulb lever includes an arm 81 which is pressed against the pin 71 by means of a spring 82, this spring having one arm engaging a pin 7 and the other arm engaging an offset 83 in the lever. The lever also includes an aperture 84 through which a stud 84' passes on which the lever may turn, and includes an upstanding arm 85 and an inwardly formed finger 86 adapted to be moved to-and-from the path of the lug 29 which extends at right angles to the closing blade 14. Consequently, when the knob 70 moves the pin 71 to the Fig. 1 position, the flange 66 lies outside of the path of the lug 29 and an instantaneous exposure will take place. However, when the pin 71 is moved to the "B" position at 73, the lever 80 may turn in a clockwise direction until the arm 85 contacts with the pin 37 carried by the trigger lever. In this position, the finger 86 will lie above the path of the lug 29 on the closing lever 14, but, nevertheless, when the trigger is depressed, the lever 80 will turn with the trigger because of the contact of arm 85 and pin 37, and thus be moved by the pin 37 to the Fig. 7 position in which it will lie in the path of lug 29 and cause movement of the closing blade 14 to halt when the exposure aperture 2 is fully open. When the trigger 40 is released, the lever 80 will turn clockwise, because of its spring, and flange 86 will move upwardly above the cam surface 30 of the closing lever 14. If the next exposure is to be an instantaneous exposure, the knob 70 is turned so that the pin 71 will rock arm 81 of lever 80 to the Fig. 1 position, causing the finger 86 to move downwardly and out of the path of the lug 29 so that the bulb lever will no longer interrupt the movement of the blade 14 and instantaneous exposures may be made. Therefore, one depression of the trigger 40 for instantaneous exposures will cause the shutter blade 3 to open the exposure aperture 2 and the closing blade 14 to close the aperture after the predetermined time interval during which the opening blade 3 moves the shutter latch. This time interval may be, for instance, 1/40 of a second if a relatively fast exposure is desired, and during the greater part of this exposure time the exposure aperture 2 is fully open, since the springs for actuating the shutter blades are relatively powerful and therefore move the shutter blades rapidly, thereby causing both the opening and the closing of the aperture to occur comparatively quickly. A test chart shows this shutter to be approximately 85 or 90 per cent efficient, which efficiency is unusually high for shutters of this general type.

It will be seen from the above specification and reference to the drawings that we have provided a device in which the several objects of this invention are achieved, and which is well adapted to meet the conditions of practical use. While we have described a preferred embodiment of our invention, as various possible embodiments may readily be made and as changes may be readily made in the embodiment above set forth, it is to be understood that all of the matter herein set forth, or shown in the accompanying drawings, is to be interpreted as illustrative only and not in a limiting sense.

Having thus described our invention, what we claim is new and desire to secure by Letters Patent of the United States is:

1. A camera shutter comprising an apertured support, a pair of pivotally mounted shutter blades carried by the support, one shutter blade forming an opening blade and having a normal set position closing the aperture and having a striking surface thereon, the other shutter blade forming a closing blade and having a normal set position spaced from the aperture, each shutter blade having an abutment, a pivotally mounted latch lever, a pair of latch elements carried thereby, one for engaging the abutment on the opening shutter blade, the other for engaging the abutment on the closing shutter blade, said latch lever being mounted for movement to several positions in one of which both blades are held against movement, in a second of which only the closing blade is held against movement, and in a third of which neither shutter blade is held against movement, said latch in the second position lying in the path of movement of the striking surface of the opening blade to be struck and moved thereby, a spring means for driving each shutter blade relative to the aperture to make an exposure through the apertured support, a trigger for engaging and moving the latch lever to the second position to move one latch element from the opening shutter blade abutment to release the opening blade for movement to open the exposure aperture while still maintaining the latch element in engagement with the closing shutter blade, and means carried by the released opening shutter blade for striking and moving the latch lever a second time to move it to a third position to release the closing shutter blade to move to an aperture-closing position, the opening shutter blade including a means for setting the shutter, the closing shutter blade including means adapted to be contacted by the opening blade to set the closing blade with the opening blade, the opening and closing blade abutments and the pivoted latch lever being positioned so that the closing blade may reach a position to be latched only when the opening blade is moved past its latching position whereby latching of the opening blade is assured after setting the closing blade.

2. The camera shutter defined in claim 1 characterized in that the opening blade includes a finger adapted to engage a pin on the closing blade for setting the latter by the former, the finger being spaced from the opening blade shutter pivot several times the spacing of the pin from the closing blade pivot whereby the closing blade will move faster than the opening blade in setting.

3. A camera shutter comprising an apertured support, a pair of shutter blades pivotally attached to the support, one on each side of the aperture, each shutter blade having an abutment thereon, one shutter blade forming an opening blade and having a normal set position closing the aperture, and having a striking surface thereon, the other shutter blade forming a closing blade and having a normal set position spaced from the aperture, a pivotally mounted lever, a pair of latch elements carried thereby, one latch element for engaging the abutment on the opening shutter blade, the other latch element for engaging the abutment on the closing shutter blade, said latch lever being mounted for movement to several positions in one of which both blades are held against movement, in a second of which only the closing blade is held against movement and in a third of which neither shutter blade is held against movement, said latch in the second position lying in the path of movement of the striking surface of the opening blade to be struck and moved thereby, a spring means for driving each shutter blade relative to the aperture to make an exposure through the apertured support, a trigger for engaging and moving the latch lever to the second position to move one latch element from the opening shutter blade abutment to release the opening blade for movement to open the exposure aperture, while still maintaining the latch element in engagement with the closing shutter blade, means carried by the released opening shutter blade for striking and moving the latch lever a second time to move it to a third position to release the closing shutter blade to move to an aperture closing position, the opening shutter blade including a means for setting the shutter, the closing shutter blade including means adapted to be contacted by the opening blade to set the closing blade with the opening blade, the opening and closing blade abutments and the pivoted latch lever being positioned for setting both the opening and closing blades through movement of the opening shutter blade, the latch lever being released by an arcuate surface carried by the closing shutter blade moving away from the latch lever whereby as the closing shutter blade is moved to its set position to engage and latch the opening shutter blade in its set position covering the exposure aperture the other shutter blade may be already held against movement.

4. The shutter defined in claim 3 characterized in that the engaging elements on the opening shutter blade and the closing shutter blade may comprise a radially extending finger on the opening shutter blade and a projection extending into a position to be engaged by the radially extending finger carried by the closing shutter blade.

ROBERT E. KESEL.
HERBERT T. ROBINSON.

REFERENCES CITED

The following references are of record in the file of this patent:

UNITED STATES PATENTS

| Number | Name | Date |
| --- | --- | --- |
| 429,929 | Luce | June 10, 1890 |

FOREIGN PATENTS

| Number | Country | Date |
| --- | --- | --- |
| 71,337 | Germany | Oct. 14, 1893 |